(12) United States Patent
Granville

(10) Patent No.: US 10,612,902 B2
(45) Date of Patent: Apr. 7, 2020

(54) CURVED GAP GAUGE

(71) Applicant: Honeywell International Inc., Morris Plains, NJ (US)

(72) Inventor: Richard Granville, Coquitlam (CA)

(73) Assignee: Honeywell International Inc., Morris Plains, NJ (US)

( * ) Notice: Subject to any disclaimer, the term of this patent is extended or adjusted under 35 U.S.C. 154(b) by 113 days.

(21) Appl. No.: 15/460,891

(22) Filed: Mar. 16, 2017

(65) Prior Publication Data
US 2018/0266804 A1 Sep. 20, 2018

(51) Int. Cl.
*G01B 3/04* (2006.01)

(52) U.S. Cl.
CPC ..................... *G01B 3/04* (2013.01)

(58) Field of Classification Search
CPC ... G01B 3/30; G01B 3/46; G01B 5/00; G01B 5/12; G01B 11/08
USPC ....................................... 33/544.4
See application file for complete search history.

(56) References Cited

U.S. PATENT DOCUMENTS

| | | | |
|---|---|---|---|
| 1,194,749 A | 8/1916 | Kirk | |
| 1,389,486 A * | 8/1921 | Brewer | G01B 3/34 33/562 |
| 1,931,352 A * | 10/1933 | Kemp | B21C 3/00 72/274 |
| 2,191,105 A * | 2/1940 | Cutler | G01B 21/08 33/200 |
| 2,197,688 A | 4/1940 | Fox | |
| 2,579,386 A | 12/1951 | Koenig | |
| 2,717,454 A * | 9/1955 | Sekki | B25H 7/005 33/529 |
| 2,901,829 A * | 9/1959 | Lucas | G01B 3/30 33/567 |
| 3,041,735 A * | 7/1962 | Allen | G01B 3/30 33/517 |
| 3,318,006 A * | 5/1967 | Martinez | G07D 9/04 33/562 |
| 4,107,850 A * | 8/1978 | Adler | G01B 3/38 30/358 |
| 4,211,241 A * | 7/1980 | Kaster | A61F 2/2496 33/512 |
| 4,219,937 A * | 9/1980 | Lorenzini | G01B 3/46 33/544.3 |
| 4,584,774 A * | 4/1986 | Link | G01B 3/30 33/202 |
| 4,677,751 A * | 7/1987 | Masseth | G01B 5/02 33/199 R |
| 4,745,685 A * | 5/1988 | Castillo | G01B 5/163 33/199 R |
| 4,888,876 A * | 12/1989 | Meredith | G01B 3/30 33/501.08 |
| 5,042,161 A * | 8/1991 | Hodge | A61B 5/1076 33/501.45 |
| 5,092,054 A | 3/1992 | Cipiti | |
| 5,199,180 A * | 4/1993 | Yablonsky | G01B 3/30 33/501.45 |

(Continued)

Primary Examiner — Yaritza Guadalupe-McCall

(57) ABSTRACT

A curved gap gauge comprises a curved structural body, a curved outer surface of the curved structural body, a curved inner surface of the curved structural body configured to be parallel to the curved outer surface, and at least one step formed in the inner surface wherein a distance between the at least one step formed in the inner surface and the curved outer surface is predefined.

20 Claims, 7 Drawing Sheets

(56) References Cited

U.S. PATENT DOCUMENTS

| | | | | |
|---|---|---|---|---|
| 5,471,748 A * | 12/1995 | Provost | ............... | A63B 53/14 |
| | | | | 30/289 |
| 5,473,966 A * | 12/1995 | Cordon | ............... | A61K 9/703 |
| | | | | 33/563 |
| 5,604,989 A * | 2/1997 | Stevenson | ............ | G01B 3/46 |
| | | | | 33/506 |
| 5,685,085 A * | 11/1997 | Bond | ................... | G01B 3/42 |
| | | | | 33/520 |
| D411,808 S * | 7/1999 | Irwin | ........................ | D10/65 |
| 6,076,267 A | 6/2000 | Gotoh | | |
| 6,178,824 B1 * | 1/2001 | Hayakawa | ........... | F16G 13/00 |
| | | | | 73/828 |
| 6,412,186 B1 * | 7/2002 | Keys | ..................... | G01B 5/12 |
| | | | | 33/522 |
| 6,438,859 B1 * | 8/2002 | Lynch | ................... | G01B 3/30 |
| | | | | 33/542 |
| 6,886,267 B1 | 5/2005 | Karwowski et al. | | |
| 6,901,672 B1 * | 6/2005 | Reilly | .................. | G01B 3/30 |
| | | | | 33/501.45 |
| 7,188,430 B2 * | 3/2007 | Tange | ................... | G01B 3/306 |
| | | | | 33/501.45 |
| 7,861,429 B2 * | 1/2011 | Lee | ........................ | G01B 5/06 |
| | | | | 33/501.45 |
| 8,875,411 B2 * | 11/2014 | Al-Dhafiri | ............ | G01B 3/26 |
| | | | | 33/21.1 |
| 9,625,246 B2 * | 4/2017 | Rodriguez | ............ | G01B 3/34 |
| 9,791,256 B1 * | 10/2017 | Beer | .................... | E06B 1/6069 |
| 10,046,456 B2 * | 8/2018 | Byrt | ..................... | B25H 7/005 |
| 2002/0095811 A1 * | 7/2002 | Lynch | .................. | G01B 3/30 |
| | | | | 33/613 |
| 2004/0083618 A1 * | 5/2004 | Kelly | ................... | G01B 3/004 |
| | | | | 33/544.4 |
| 2007/0209221 A1 * | 9/2007 | Zipplies | ............. | A61C 8/0089 |
| | | | | 33/512 |

* cited by examiner

CURVED GAP GAUGE

TECHNICAL FIELD

Embodiments are generally related to gauges. Embodiments are further related to measuring instruments. Embodiments are also related to gap gauges. More particularly, embodiments are related to a curved gap gauge. Embodiments are also related to methods and systems associated with measurements taken during alignment of equipment for paper manufacturing.

BACKGROUND

Inductive coils are currently used in conjunction with calendar roll stacks in the process of making paper. The coils are necessary to uniformly control the caliper (thickness) across the width of the sheet. The inductive coil is able to achieve cross-directional control of the caliper by inductively heating a steel roll in the calendar stack. Heating in specific areas (or zones) across the width of the roll is made possible by the coils.

Banks of induction coils are mounted to a beam so that they can be placed a specified distance away from the roll. This arrangement allows precision heating of the rolls. However, in order to operate properly, the coil banks must be very accurately aligned on the beam. The accuracy allows the coils to function properly without contacting the roll.

Currently, factory personnel use a small ruler or measuring block to gage the distance from the workcoil surface to the reference surface. However, this technique results in highly irregular readings, is time consuming, and often results in inaccurate measurements. Additionally, the results of workcoil setup can vary between different workers because the measurement methods they use, either with a ruler or measuring block, result in inconsistent readings.

Accordingly, there is a need in the art for methods, systems, and devices that provide accurate measurement of the gap between induction coils and associated beams, both during original construction and upon installation.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore one aspect of the disclosed embodiments to provide a measurement device.

It is another aspect of the disclosed embodiments to provide a gauge.

It is another aspect of the disclosed embodiments to provide a gauge comprising a curved gap gauge.

It is an additional aspect of the disclosed embodiments to provide a stiff curved gap gauge for use in manufacturing alignment and setup of inductive coils.

It is another aspect of the disclosed embodiments to provide a flexible curved gap gauge for use in alignment and installation of inductive coils in manufacturing application.

It is yet another aspect of the disclosed embodiments to provide a method for determining a gap between one surface and a second, curved surface.

The aforementioned aspects and other objectives and advantages can now be achieved as described herein. In one example, embodiment comprises a curved structural body, a curved outer surface of the curved structural body, a curved inner surface of the curved structural body configured to be parallel to the curved outer surface, and at least one step formed in the inner surface wherein a distance between the at least one step formed in the inner surface and the curved outer surface is predefined.

In other embodiments, a method for measuring a gap comprises configuring a curved gap gauge, inserting the curved gap gauge between a first surface and a second surface, identifying contact between an inner surface of the curved gap gauge and a first surface and between an outer surface of the curved gap gauge and the second surface, and determining a width of the gap according to a location where the inner surface of the curved gap gauge contacts the first surface and where the outer surface of the curved gap gauge contacts the second surface.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
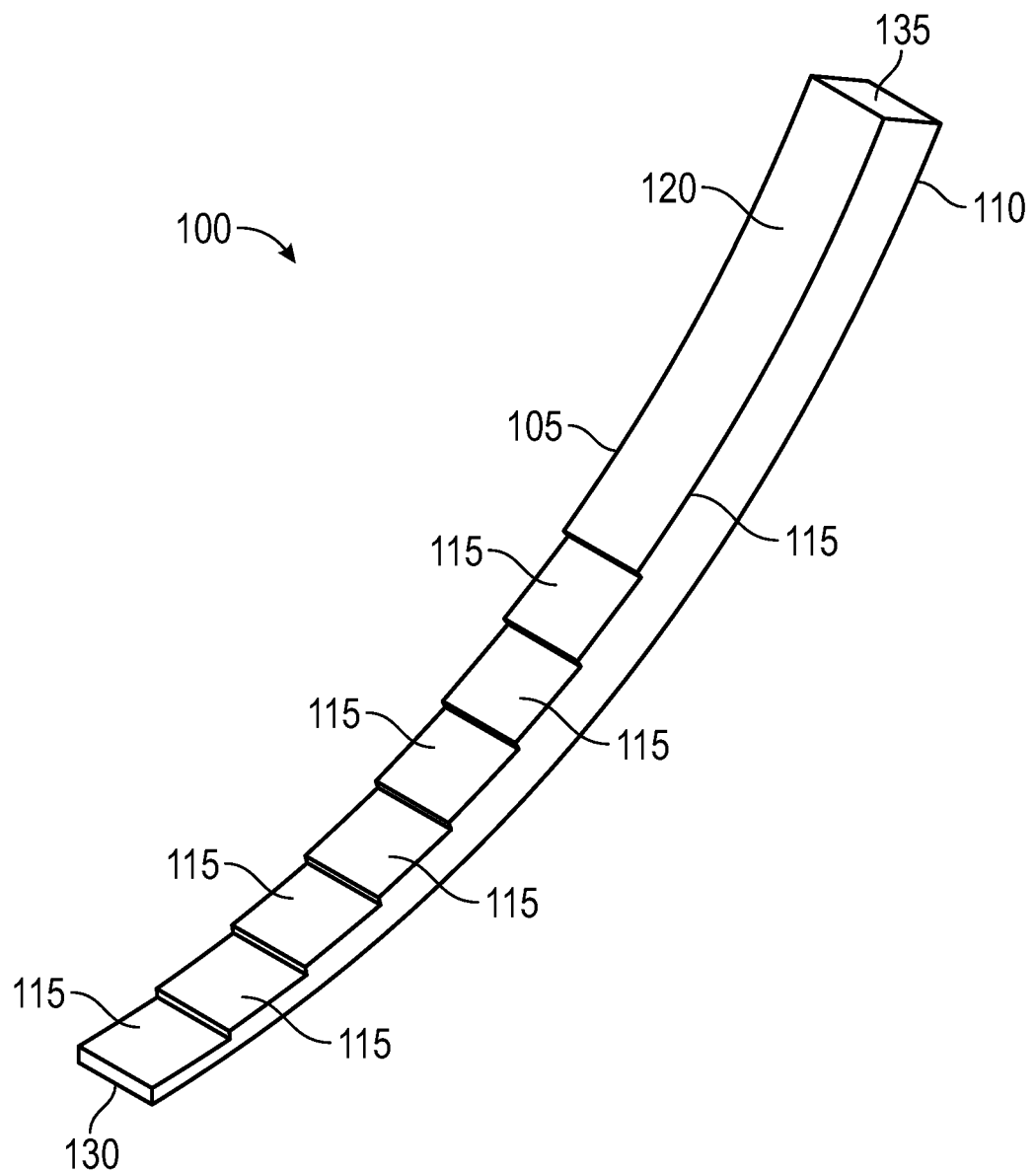
FIG. 1 depicts a curved gap gauge in accordance with an exemplary embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, processes, devices, apparatuses, components, or systems. Accordingly, embodiments may, for example, take the form of systems, apparatuses, methods, or any combination thereof (other than software per se). The following detailed description is therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be utilized to describe any feature, structure, or characteristic in a singular sense or may be utilized to describe combinations of features, structures or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The embodiments disclosed herein describe a curved gap gauge for gauging the distance, or gap, between surfaces. Generally, the curved gap gauge may be used to determine the gap between any two surfaces. The curved gap gauge is most usefully applied to measure the gap between surfaces when one or more of the surfaces is curved.

In certain embodiments, the curved gap gauge is applied to measurements associated with inductive coils, such as Calcoil's Workcoils, commonly used in paper manufacturing. The embodiments disclose a setup tool that can be used during the factory manufacturing alignment and setup of inductive coils. The embodiments described herein can also be used in the field to verify workcoil alignment, especially after a workcoil replacement has occurred and realignment becomes necessary.

In certain embodiments, a curved gap gauge can be used to measure a gap between a reference surface and a string line. The string line may represent a specifically selected distance from an inductive coil, necessary for an application of the inductive coil, and can be connected to endplates at the end of, for example, a Calcoil beam or other such assembly. The string line is placed a desired distance (commonly 5 mm, but other distances are also possible) from the centerline of the curved surface of the workcoils on each end of the beams. The string line is then used at the datum to align the rest of the workcoils.

FIG. 1 illustrates a stiff curved gap gauge 100 in accordance with one embodiment. The stiff curved gap gauge 100 comprises a curved structural body 135, which is a section of material that can be curved with a predetermined radius that matches the radius of a curved surface on which the curved gap gauge 100 will be used for measurements. In an exemplary embodiment, such a curved surface may be an inductive coil, but any type of reference surface is possible. The inner surface 105 of the curved gap gauge 100 is configured to be substantially parallel with the outer surface 110, along each of the gauge steps 115 as illustrated. In other words, the curvature of the inner surface 105 along gauge steps 15 matches the curvature of the outer surface 110.

Each of the gauge steps 115 has a predetermined thickness representing a predetermined gauge measurement for measuring the distance between two surfaces. For example, the gauge steps 115 can provide readings indicative of the distance between an inductive coil and a reference surface (e.g., a string line). The number of gauge steps 115 can vary according to design considerations. In certain embodiments, one end of the gauge steps 115 can be substantially longer than the remaining gauge steps 115. In such embodiments, the end gauge step 115 serves as a handle 120 for manipulating the stiff curved gap gauge 100.

Figure 2A:
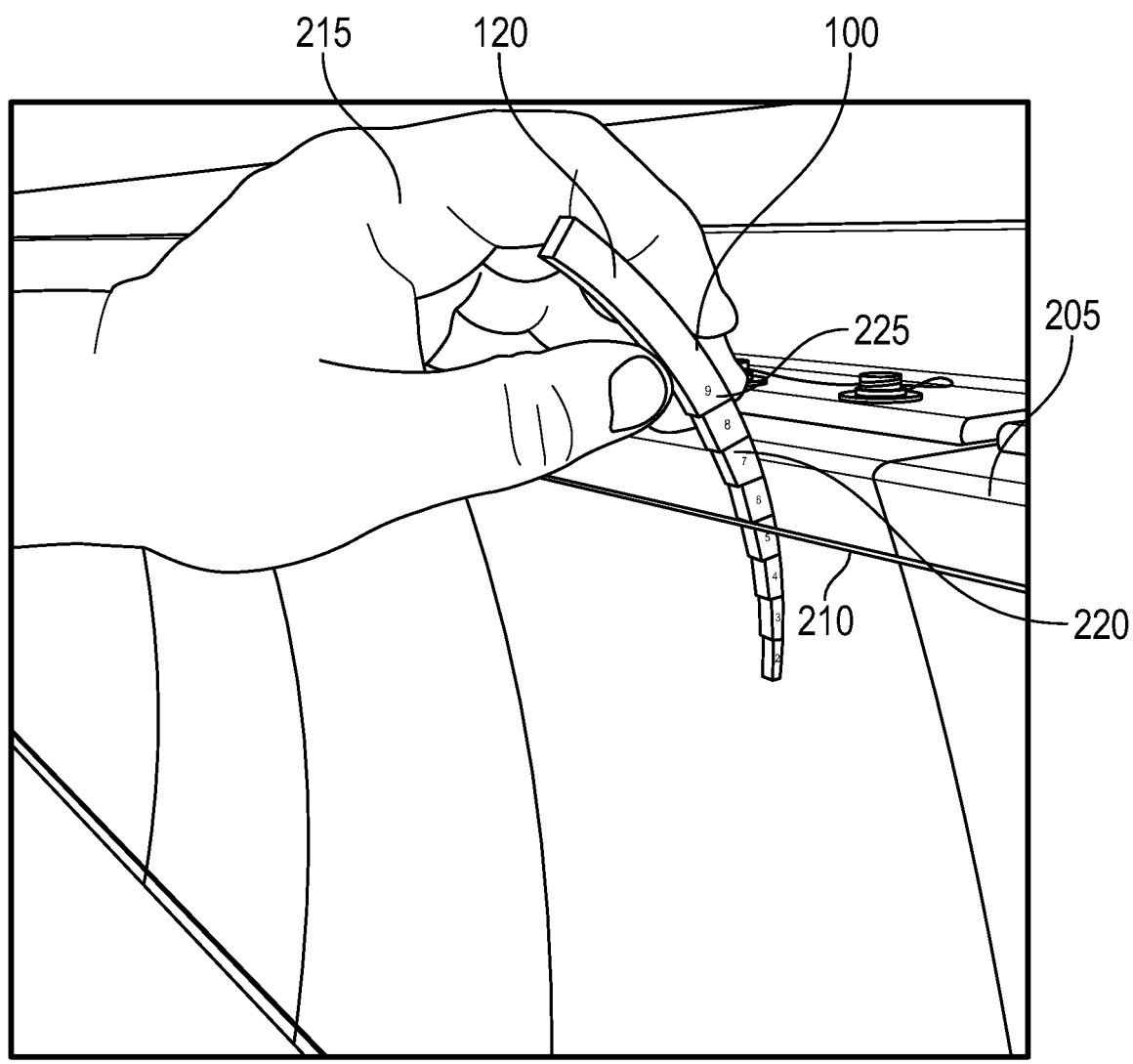
FIG. 2A depicts the application of a curved gap gauge to determine a distance in accordance with an exemplary embodiment.

In practice, the stiff curved gap gauge 100 can be inserted between the curved surface of an inductive coil and a reference surface (e.g., a string line, roller, etc.). FIG. 2A illustrates the application of a stiff curved gap gauge 100 between a Calcoil beam 205 and a string line 210, in accordance with an embodiment. A user 215 engages the stiff curved gap gauge 100 with the grip 120 and inserts the stiff curved gap gauge 100 between the Calcoil beam 205 and string line 210 to determine the distance there between.

The gauge steps 115 that are thinner than the distance between the two surfaces will simply pass between the two surfaces. As the stiff curved gap gauge 100 is further inserted between the surfaces, one of the gauge steps will match the distance between the two surfaces. This step can be verified via visual identification of contact between one of the reference surfaces and the inner side 105 of the stiff curved gap gauge 100, and between the other reference surface and the outer side 110 of the stiff curved gap gauge. Alternatively, verification of the distance may be made by noting resistance to further insertion of the stiff curved gap gauge 100 between the reference surfaces, indicating the stiff curved gap gauge 100 has contacted both reference surfaces.

In order to identify the distance between two surfaces, each gauge step 115 of the stiff curved gap gauge 100 can be calibrated to a specified thickness. For example, the first step may be 2 millimeters, the second step may be 3 millimeters, and so on up to a desired thickness (for example, 10 millimeters). In other embodiments, other specified thicknesses can be used according to design considerations. The gauge steps 115 should incrementally increase in thickness from the insertion end 130 to the handle 120.

Each of the steps can be marked, embossed, etched, or stamped with visual lettering and/or numbering indicating the thickness of the step. In certain embodiments, this can include numerals indicating a thickness value of the gauge step and/or the units of the numeral. For example, if the first step of the gauge steps 115 is calibrated to 2 millimeters, marking may be included on the front, back, and/or either side of the gauge step indicating "2 mm." The lettering is not limited to metric units and may include units according to any system of measurement. Likewise, the number of steps, the change in thickness from one step to another, and the length of each step may be chosen according to design considerations and the specific application intended for the stiff curved gap gauge 100. FIG. 2A illustrates markings 225.

Additionally, one or both sides and/or the top or bottom of the stiff curved gap gauge 100 can be marked, embossed, etched, or stamped with visual indicators 220 that illustrate the end of one of gauge steps 115 and the beginning of the next gauge step.

Figure 2B:
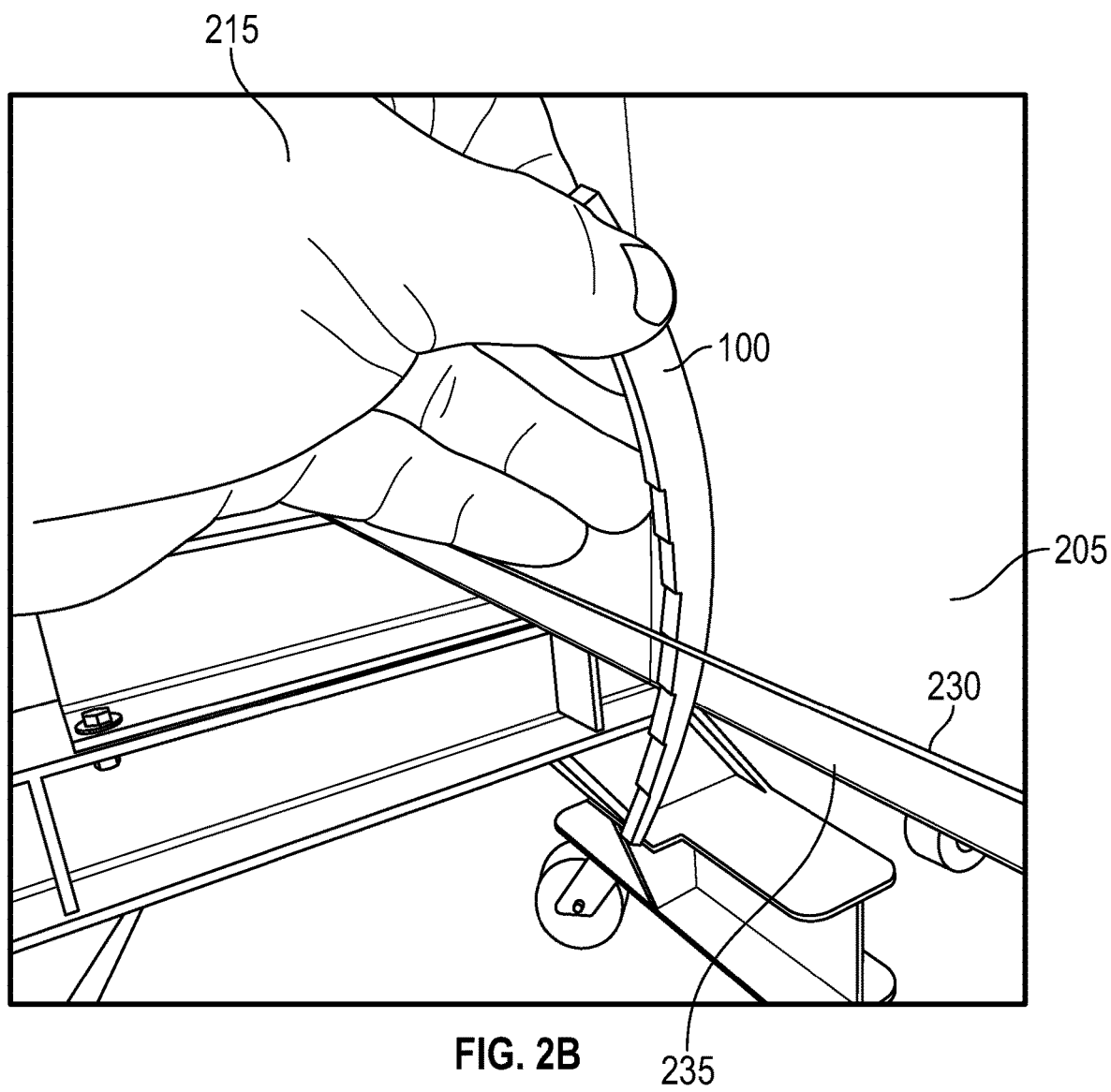
FIG. 2B depicts an alternative application of a curved gap gauge to determine a distance in accordance with an exemplary embodiment.

FIG. 2B further illustrates that, in certain embodiments, the stiff curved gap gauge 100 can be used to measure a distance to multiple surfaces of a single reference. In FIG. 2B, the stiff curved gap gauge is illustrated measuring a distance between a second string line 230 and Calcoil beam 205. The second string line 230 is proximate to the bottom edge 235 of Calcoil beam 205. The stiff curved gap gauge 100 can once again be used to determine and/or calibrate the distance between the string line 230 and Calcoil beam 205.

The stiff curved gap gauge 100 can be configured to be stiff and/or hard. In such embodiments, the stiff curved gap gauge 100 can be made from a non-marking material such as aluminum, brass, other such metals, hard rubber, or hard plastic that maintains its shape. It is important for the stiff curved gap gauge 100 to be made of a non-marking material to ensure that it does not leave residual markings on the inductive coils and/or reference surface with which it is being used.

In other embodiments, the stiff curved gap gauge 100 can be manufactured as a 3D printed part. In certain embodiments, metal production models can be water cut to achieve the desired gauge width. In embodiments where the stiff curved gap gauge is made of metal, metal production can include metal printing, casting, or sintering. In still other embodiments, the stiff curved gap gauge 100 can be produced via conventional or CNC machining. In the case of hard plastic product, the stiff curved gap gauge 100 can be die cut from a sheet, plastic printed, or injection molded.

In an exemplary embodiment, the stiff curved gap gauge 100 can be primarily used during initial workcoil setup at a factory. In such applications, a production inductive coil is being installed at its final location and precise alignment of the coil is required. Note that because the inductive coil radius and/or associated roll (or other surface) is known, the stiff curved gap gauge 100 can be preformed to have an inner and outer radius that matches the radius of the curved reference surface.

In other embodiments, the stiff curved gap gauge 100 may also serve as a useful tool in numerous other applications where it is desirable to determine the distance between a reference surface and another round, tubular, or curved surface.

Figure 3:
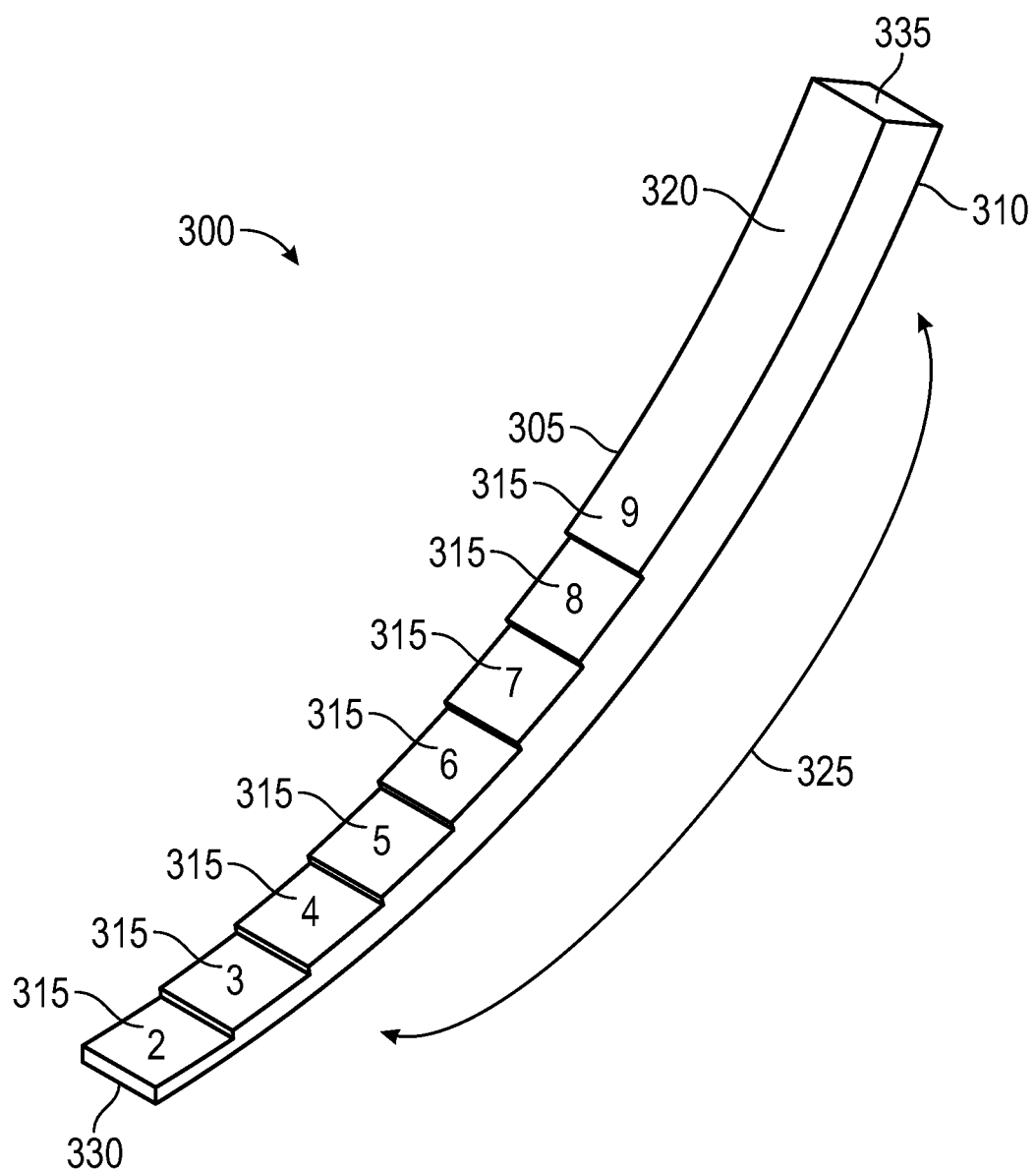
FIG. 3 depicts an alternative embodiment of a curved gap gauge, in accordance with an exemplary embodiment.

In another embodiment, illustrated in FIG. 3, a flexible curved gap gauge 300 can comprises a curved structural body 335 that is a section of curved material with a predetermined radius that fits an inductive coil or other such curved surface. The inner surface 305 of the flexible curved gap gauge 300 is configured to be parallel with the outer surface 310, along each of the gauge steps 315 as illustrated.

Each of the gauge steps 315 has a predetermined thickness representing a predetermined gauge measurement for measuring the distance between two surfaces, for example, a coil and a reference surface. The number, thickness, and length of gauge steps 315 can vary according to design considerations. In certain embodiments, the gauge step at one end of the gauge steps 315 can be substantially longer than the remaining gauge steps 315. In such embodiments, the end gauge step serves as a handle 320 for manipulating the flexible curved gap gauge 300. In such embodiments, the handle 320 may be hard and/or stiff, while the remainder of the flexible curved gap gauge 300 remains flexible. In other embodiments, the handle 320, along with the remainder of the flexible curved gap gauge 300, can be flexible.

In practice, the flexible curved gap gauge 300 can be inserted between the curved surface of, for example, an inductive coil and a reference surface (e.g., a roll, etc.). The gauge steps 315 that are thinner than the distance between the two surfaces will simply pass between the surfaces. As the flexible curved gap gauge 300 is further inserted into the space between the surfaces, one of the gauge steps will match the distance between the surfaces (e.g., the coil and the roll). This gauge step 315 can then be identified via visual identification of contact between one surface and the inner side 305 of the flexible curved gap gauge 300 and between the other surface and the outer side 310 of the flexible curved gap gauge 300. Alternatively, identification of the distance between the surfaces can be determined by identifying the gauge step 315 that causes the flexible curved gap gauge to encounter resistance, indicating it has contacted both reference surfaces (e.g., the coil and the roll).

In order to identify the distance between two surfaces, each gauge step 315 of the flexible curved gap gauge 300 can be calibrated to a specified thickness. For example, the first step may be 2 millimeters, the second step may be 3 millimeters, and so on up to a desired thickness (for example, 9 millimeters). It should be appreciated that the steps may be gauged at any thickness and the interval between thicknesses may also be selected according to design considerations. The gauge steps 315 should incrementally increase in thickness from the insertion end 330 to the handle 320.

Each of the steps 315 may be marked, embossed, engraved, etched, etc., with visual lettering indicating the thickness (or gauge) of a given gauge step 315. This marking may include numerals and/or the units of the numerals. For example, if the first step of the gauge steps 315 is calibrated to 2 millimeters, lettering may be included on the front, back, and/or side of the gauge step 315 indicating "2 mm." The lettering is not limited to metric units and may include units according to any system of measurement. Likewise, the number of steps, the change in thickness from one gauge step 315 to another, and the length of each gauge step 315 may be chosen according to design considerations and the specific application intended for the flexible curved gap gauge 300.

The flexible curved gap gauge 300 can be configured from a non-marking flexible material such as urethane, plastic, rubber, etc., that can flex/bend to match the radius gap of the reference surfaces (e.g., the roll/workcoil radius gap) as illustrated by arrow 325. The flexible curved gap gauge 300 can be die cut from a sheet of plastic, 3D printed, or injection molded. In other embodiments, the flexible curved gap gauge 300 can be manufactured using conventional or CNC machining.

The flexible curved gap gauge 300 is thus unique in that it has a radius on its outer reference surface that can be manipulated as illustrated by arrow 325 to match a reference surface (e.g., an inductive coil) so that it can be placed against a curved surface and an accurate measurement can be achieved.

Figure 4A:
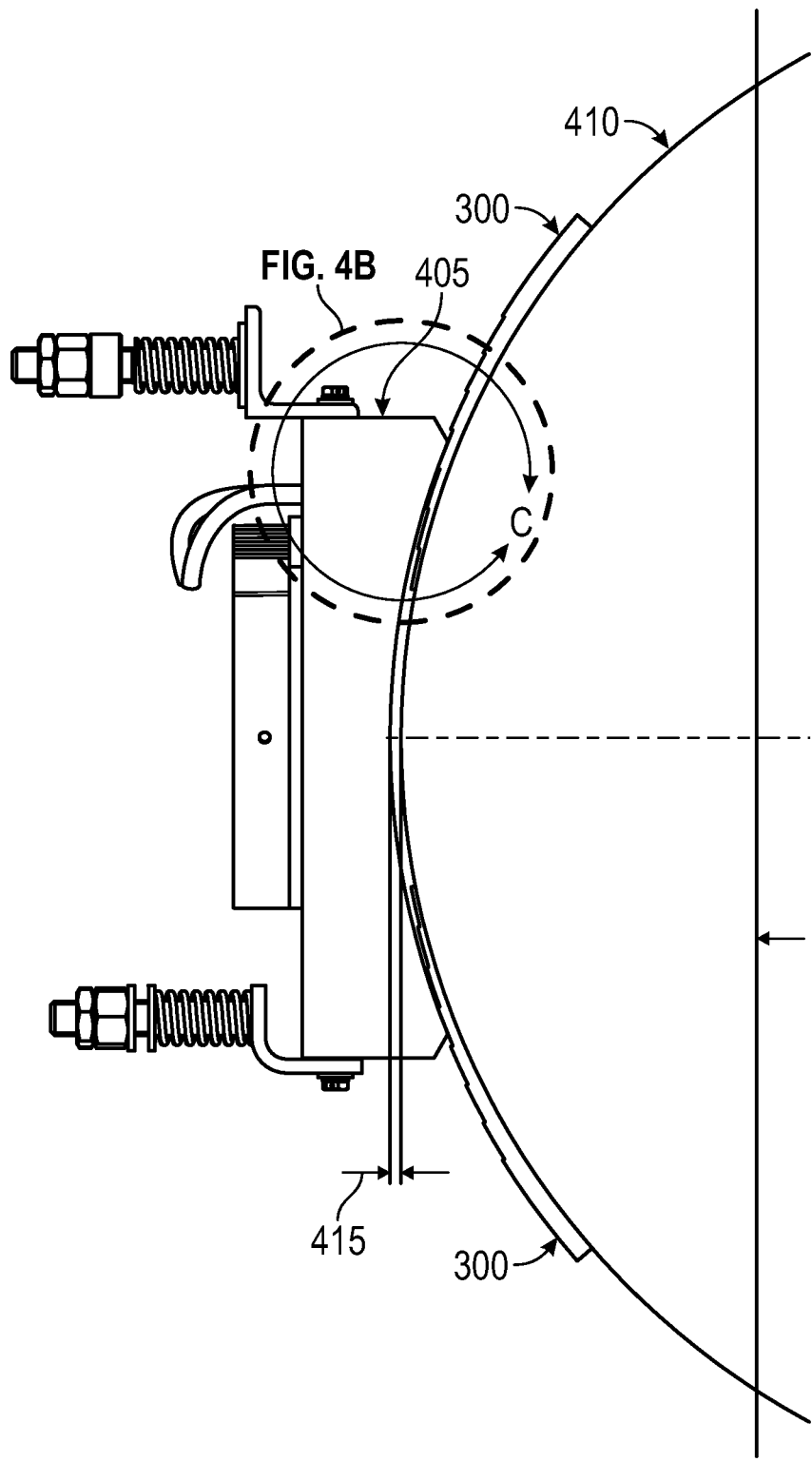
FIG. 4A depicts an alternative application of a curved gap gauge to determine a distance, in accordance with an exemplary embodiment.
Figure 4B:
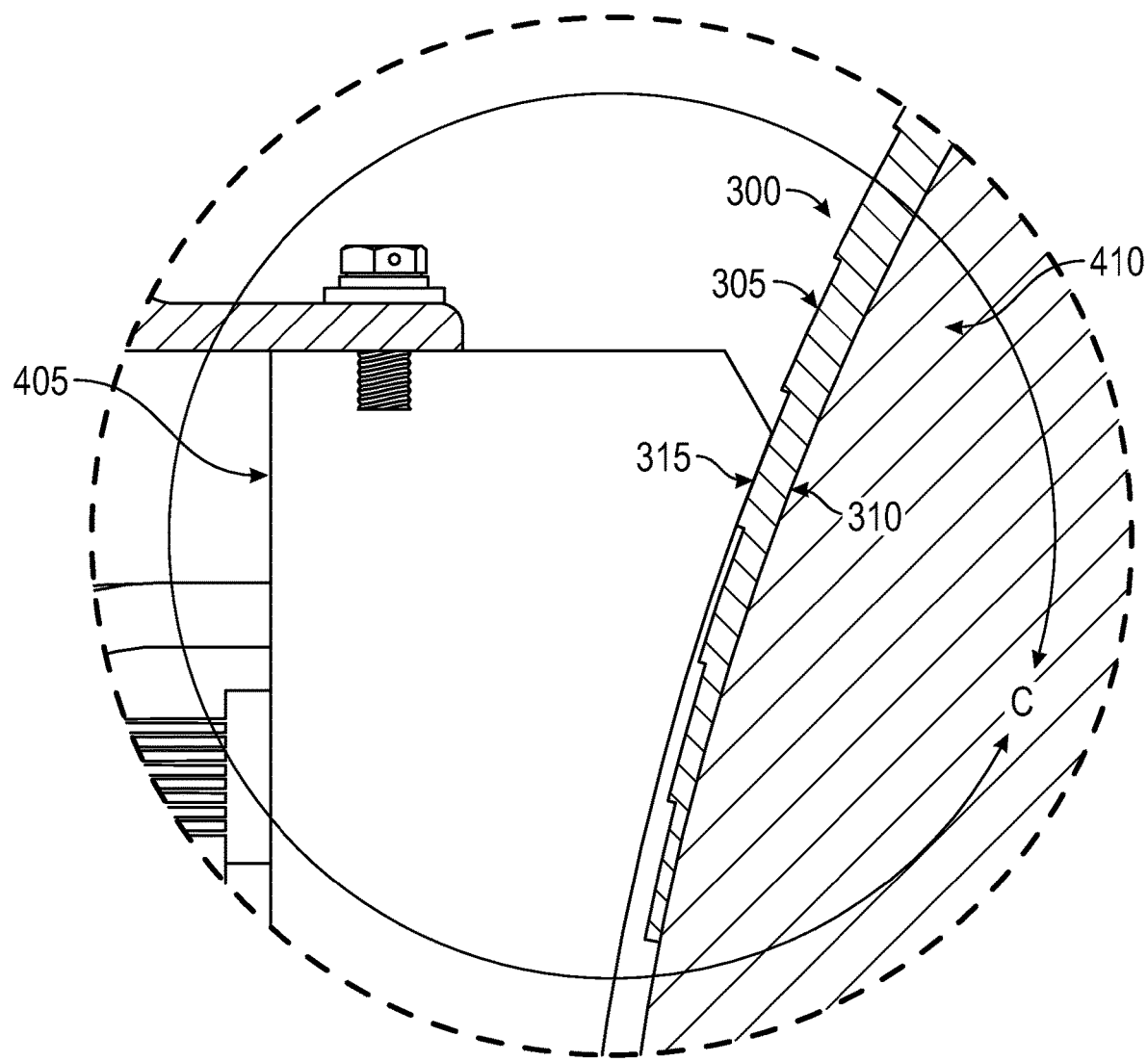
FIG. 4B depicts an exploded view of the alternative application of a curved gap gauge to determine a distance illustrated in FIG. 4A, in accordance with an exemplary embodiment.

In an exemplary embodiment, the flexible curved gap gauge 300 can be deployed in a mill during the installation setup of a Calcoil Beam of inductive coils 405, such as a Calcoil Workcoil. Such a situation is illustrated in FIGS. 4A and 4B. During setup of the workcoil 405 to an application roll 410, the Calcoil beam of workcoils uses a retraction mechanism to move the entire Calcoil Beam towards the roll so that the banks of workcoils are a specified operating distance from the steel roll. The workcoils 405 can be placed, for example, 5 mm from the centerline of the curved surface of the roll 410 on each end of the beam. The gap 415 illustrates such an arrangement of the workcoil 405 and roll 410. In certain embodiments, other distances may alternatively be used.

FIG. 4B illustrates an exploded view of detail C from FIG. 4A. The curved, outer side 310 of the flexible curved gap gauge 300 can then be positioned along the curved surface of the roll 410. The inner side 305 of the flexible curved gap gauge 300 will eventually touch the workcoil 405 as the gauge is inserted between the roll 410 and the workcoil 405. The point at which the outer surface 310 contacts the roll 410 and the inner surface 305 contacts the workcoil 305 provides a gauge measurement that can be read by a user. If the measurement between the roll 410 and the workcoil 405 matches the desired distance, the user can extract the gauge. If the measurement is not correct, the user can adjust the workcoil and/or roll as required so that the distance between the workcoil 405 and roll 410 is correct. Once the measurement at one location is verified, the flexible curved gap gauge 300 can be similarly used to adjust the distance at a selection of points along the workcoil 405, and at both the top and bottom of the workcoil 405 as shown in FIG. 4A, until the workcoil 405 and/or roll 410 are properly positioned.

In practice, the flexible curved gap gauge 300 may prove most useful to configure the roll to workcoil gap alignment during initial workcoil installation and/or during workcoil replacement. In such a case, the flexible curved gap gauge 300 can be inserted into the gap between a roll, for example, a steel roll, and the surface of the workcoil. The reference surface of the flexible curved gap gauge can be slid against the curved surface of the roll until it can go no further. The corresponding measurement can then be read by the user and the workcoil beam can be adjusted as required.

Figure 5:
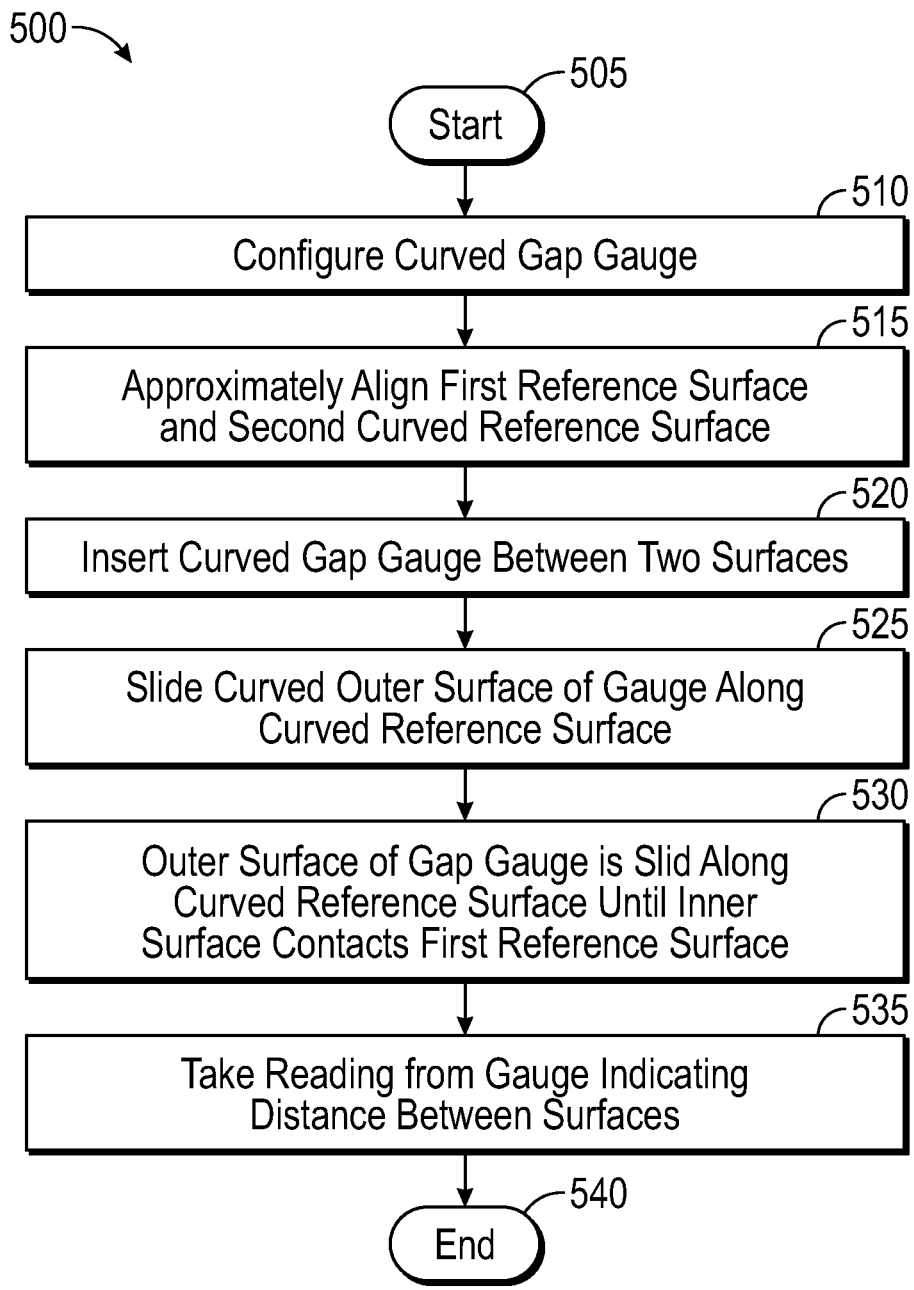
FIG. 5 depicts a flow chart illustrating steps of a method for measuring a gap using a curved gap gauge, in accordance with an exemplary embodiment.

FIG. 5 illustrates a flow chart 500 illustrating a method for measuring a distance between a curved and reference surface in accordance with the disclosed embodiments. The method begins at step 505. At step 510, a curved gap gauge such as stiff curved gap gauge 100 or flexible curved gap gauge 300 can be configured. This can include determining a set of parameters likely to be measured and then creating a flexible or stiff gap gauge with a desired number of gauge steps, with a desired length of each step, and at a desired set of thicknesses. At step 510, the radius of the curved gap gauge is formed to match the radius of the curved reference surface. Markings indicating the thickness of each gauge step and delineating the step may be included on the curved gap gauge.

The gap gauge may be manufactured in any number of ways including, but not limited to, 3D printing, water jet machining, metal printing, conventional or CNC machining, casting, sintering, die cutting from a sheet, injection molding, and/or plastic printing.

Next, a reference surface can be arranged at an approximately desirable distance from a second curved surface as shown at step 515. In certain embodiments, this includes placing a block on each end of a workcoil to create a gap between a string line, which serves as one reference surface, and a workcoil face which serves as a second curved surface.

At step 520, the curved gap gauge can be inserted between the string line and the workcoil face. The curved outer surface of the curved gap gauge is slid along the surface of the curved reference surface as illustrated at step 525. With the outer surface of the curved gap gauge in contact with the curved reference surface, the inner surface of the curved gap gauge eventually contacts the first reference surface (e.g., a string line) as shown at step 530. At this point a reading can be taken from the gauge to determine the distance between the reference surfaces as illustrated at step 535. The method then ends at step 540.

It should be appreciated that, in certain embodiments, one or more of these steps can be repeated. For example, when aligning a work coil, the readings of distances between a string line and the work coil may be taken at 10-20 locations along the work coil on both the top and bottom of the work coil to ensure the gap is consistently within a predetermined tolerance of a reference distance (i.e., a distance of 5 mm+/−1 mm tolerance). If the gap is larger or smaller than this tolerance, the bank of workcoils can be readjusted until the workcoil faces align within the required specification.

Obtaining an accurate measurement from a curved surface to a reference surface is of exceptional value in the installation or adjustment of workcoils. The notched levels of the curved gap gauge give the user quick feedback allowing much faster workcoil setup and promote repeatable results. In other embodiments, the curved gap gauge can be used as a go/no go gauge to indicate proper installation of workcoils and/or rolls. The embodiments are inexpensive to make and simple and intuitive to use. Little or no training is required for technicians to make use of the curved gap gauge.

Based on the foregoing, it can be appreciated that a number of embodiments, preferred and alternative, are disclosed herein. For example, in one embodiment, a system comprises a curved structural body, a curved outer surface of the curved structural body, a curved inner surface of the curved structural body configured to be parallel to the curved outer surface, and at least one step formed in the inner surface wherein a distance between the at least one step formed in the inner surface and the curved outer surface is predefined.

In an embodiment, the curved structural body comprises at least one of a hardened plastic, metal, and a hardened polymer. In another embodiment, the curved structural body comprises at least one of a flexible plastic, a flexible rubber, a flexible polymer, and urethane.

In another embodiment, the at least one step formed in the inner surface further comprises a plurality of steps formed in the inner surface wherein a distance between each of the plurality of steps in the inner surface and the curved outer surface is predefined.

In an embodiment, the system further comprises a handle formed at an end of the curved structural body. In an embodiment, a radius of the curved structural body is configured to match a radius of a reference surface. In another embodiment, the at least one step indicates a distance between two surfaces.

In yet another embodiment, a curved gap gauge comprises a curved structural body, a curved outer surface of the curved structural body, a curved inner surface of the curved structural body configured to be parallel to the curved outer surface, and at least one step formed in the inner surface wherein a distance between the at least one step formed in the inner surface and the curved outer surface is predefined.

In an embodiment, the curved structural body comprises at least one of a hardened plastic, metal, and a hardened polymer. In another embodiment, the curved structural body comprises at least one of a flexible plastic, a flexible rubber, a flexible polymer, and urethane.

In another embodiment, the at least one step formed in the inner surface further comprises a plurality of steps formed in the inner surface wherein a distance between each of the plurality of steps in the inner surface and the curved outer surface is predefined.

In an embodiment, the curved gap gauge further comprises a handle formed at an end of the curved structural body. In an embodiment, a radius of the curved structural body is configured to match a radius of a reference surface. In an embodiment, the at least one step indicates a distance between two surfaces.

In yet another embodiment, a method for measuring a gap comprises configuring a curved gap gauge, inserting the curved gap gauge between a first surface and a second surface, identifying contact between an inner surface of the curved gap gauge and a first surface and between an outer surface of the curved gap gauge and the second surface, and determining a width of the gap according to a location where the inner surface of the curved gap gauge contacts the first surface and where the outer surface of the curved gap gauge contacts the second surface.

In another embodiment, configuring a curved gap gauge further comprises forming a curved structural body, forming the outer surface as a curved outer surface of the curved structural body, forming the inner surface as a curved inner surface of the curved structural body parallel to the curved outer surface, and forming at least one step in the inner surface wherein a distance between the at least one step formed in the inner surface and the curved outer surface is predefined.

In an embodiment, the method further comprises forming a handle at an end of the curved structural body. In an embodiment, the method further comprises forming a radius of the curved structural body to match a radius of the second surface. In another embodiment, the method further comprises sliding the outer surface of the curved gap gauge along the first surface.

In another embodiment, the method of determining a width of the gap according to a location the inner surface of the curved gap gauge contacts the first surface and the outer surface of the curved gap gauge contacts the second surface further comprises reading a marking indicative of a thickness of the at least one step of curved gap gauge.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A system for measuring distance between an inductive coil and a reference surface, comprising:
   a curved structural body;
   a curved outer surface of said curved structural body adapted to interface with a curvature of the inductive coil;
   a curved inner surface of said curved structural body configured to be parallel to said cured outer surface and adapted to interface with reference surface; and
   at least one step formed in said inner surface wherein a distance between said at least one step formed in said inner surface and said curved outer surface is predefined to achieve manufacturing alignment and setup of the inductive coil, and wherein the curvature of the inner surface of the step matches the curvature of the curved outer surface of the curved structural body.

2. The system of claim 1, wherein said curved structural body comprises at least one of:
   a hardened plastic;
   metal;
   a hardened polymer;
   a flexible plastic;
   a flexible rubber;
   a flexible polymer; and
   urethane.

3. The system of claim 1, wherein said reference point comprises at least one of:
   a roller;
   and
   a string line.

4. The system of claim 1, wherein said at least one step formed in said inner surface further comprises:
   a plurality of steps formed in said inner surface wherein a distance between each of said plurality of steps in said inner surface and said curved outer surface is predefined.

5. The system of claim 1, further comprising:
   a handle formed at an end of said curved structural body.

6. The system of claim 1, wherein a radius of said curved structural body is configured to match a radius of at least one of the inductive coil and the reference surface.

7. The system of claim 1, wherein said at least one step includes a marking that indicates a distance between two surfaces.

8. A curved gap gauge, comprising:
   a curved structural body;
   a curved outer surface of said curved structural body adapted to interface with a curvature of the inductive coil;
   a curved inner surface of said curved structural body configured to be parallel to said cured outer surface and adapted to interface with reference surface; and
   at least one step formed in said inner surface wherein a distance between said at least one step formed in said inner surface and said curved outer surface is predefined to achieve manufacturing alignment and setup of the inductive coil, and wherein the curvature of the inner surface of the step matches the curvature of the curved outer surface of the curved structural body.

9. The curved gap gauge of claim 8, wherein said curved structural body comprises at least one of:
   a hardened plastic;
   metal;
   a hardened polymer;
   a flexible plastic;
   a flexible rubber;
   a flexible polymer; and
   urethane.

10. The curved gap gauge of claim 8, wherein said reference point comprises at least one of:
    a roller;
    and
    a string line.

11. The curved gap gauge of claim 8, wherein said at least one step formed in said inner surface further comprises:
    a plurality of steps formed in said inner surface wherein a distance between each of said plurality of steps in said inner surface and said curved outer surface is predefined.

12. The curved gap gauge of claim 8, further comprising:
    a handle formed at an end of said curved structural body.

13. The curved gap gauge of claim 8, wherein a radius of said curved structural body is configured to match a radius of a reference surface.

14. The curved gap gauge of claim 8, wherein said at least one step indicates a distance between two surfaces.

15. A method for measuring a gap between an inductive coil and a reference point, said method comprising:
    configuring a curved gap gauge between reference surface and inductive coil;
    identifying contact between an inner surface of said curved gap gauge and the reference surface and between an outer surface of said curved gap gauge and surface the inductive coil; and
    determining a width of said gap according to a location where said inner surface of said curved gap gauge contacts said reference surface and where said outer surface of said curved gap gauge contacts said inductive coil, and wherein the curvature of the inner surface of the step matches the curvature of the curved outer surface of the curved structural body.

16. The method of claim 15, wherein configuring a curved gap gauge further comprises:
   forming a curved structural body;
   forming said outer surface as a curved outer surface of said curved structural body;
   forming said inner surface as a curved inner surface of said curved structural body parallel to said curved outer surface; and
   forming at least one step in said inner surface wherein a distance between said at least one step formed in said inner surface and said curved outer surface is predefined.

17. The method of claim 16, further comprising:
   forming a handle at an end of said curved structural body.

18. The method of claim 16, further comprising:
   forming a radius of said curved structural body to match a radius of said second surface.

19. The method of claim 16, further comprising:
   sliding said outer surface of said curved gap gauge along said first surface.

20. The method of claim 16, wherein determining a width of said gap according to a location of said inner surface of said curved gap gauge contacts said first surface and said outer surface of said curved gap gauge contacts said second surface further comprises;
   reading a marking indicative of a thickness of said at least one step of curved gap gauge.

* * * * *